United States Patent
Hsieh et al.

(10) Patent No.: US 12,214,617 B2
(45) Date of Patent: Feb. 4, 2025

(54) BIODEGRADABLE MARKER PEN

(71) Applicant: Sunny Pro Co., Ltd., New Taipei (TW)

(72) Inventors: Chi-Ting Hsieh, New Taipei (TW);
Jung-Shan Huang, New Taipei (TW);
Shun-Chih Fang, New Taipei (TW);
Chao-Han Huang, New Taipei (TW);
Siu-Hei Choi, New Taipei (TW)

(73) Assignee: Sunny Pro Co., Ltd., New Taipei (TW)

( * ) Notice: Subject to any disclaimer, the term of this patent is extended or adjusted under 35 U.S.C. 154(b) by 0 days.

(21) Appl. No.: 18/407,580

(22) Filed: Jan. 9, 2024

(65) Prior Publication Data

US 2024/0227428 A1 Jul. 11, 2024

Related U.S. Application Data

(60) Provisional application No. 63/479,203, filed on Jan. 10, 2023.

(51) Int. Cl.
*B43K 5/02* (2006.01)
*B43K 5/00* (2006.01)
*B43K 15/00* (2006.01)
*B43K 23/08* (2006.01)

(52) U.S. Cl.
CPC ............ *B43K 5/02* (2013.01); *B43K 15/00* (2013.01); *B43K 5/005* (2013.01); *B43K 23/08* (2013.01)

(58) Field of Classification Search
CPC ......... B43K 7/005; B43K 5/02; B43K 15/00; B43K 7/02; B43K 8/003; B43K 5/005; B43K 8/02; B43K 23/08
USPC .......................................... 401/52, 195, 196
See application file for complete search history.

(56) References Cited

U.S. PATENT DOCUMENTS

| 5,906,446 | A | 5/1999 | McCulloch et al. |
| 6,562,938 | B2 | 5/2003 | Haile et al. |
| 11,679,618 | B2 * | 6/2023 | Ichikawa ............. B43K 8/03 401/222 |
| 11,801,974 | B2 * | 10/2023 | Merritt ............. B65D 47/2081 |
| 2010/0272499 | A1 | 10/2010 | Wysocan et al. |

* cited by examiner

*Primary Examiner* — David J Walczak
(74) *Attorney, Agent, or Firm* — Best & Flanagan LLP

(57) ABSTRACT

A biodegradable marker pen including a barrel, a cap, and an ink reservoir. The barrel has a hollow cylindrical structure, the ink reservoir is placed in the barrel, and the cap is detachably coupled with the barrel hermetically. The barrel, the cap, and the ink reservoir comprise 2 to 10 mass percentage of a biodegradable masterbatch respectively.

15 Claims, 6 Drawing Sheets

BIODEGRADABLE MARKER PEN

FIELD OF INVENTION

This invention relates to a writing or drawing instrument, particularly to a biodegradable writing or drawing instrument.

BACKGROUND OF THE INVENTION

Marker pens are versatile writing and drawing tools that find application in various fields due to their ease of use, portability, and vibrant ink colors. While marker pens are renowned for their versatility and effectiveness as writing and drawing instruments, the volatility of their ink underscores the significance of the pen's sealing ability. The vibrant and quick-drying feature of marker ink, while advantageous for creative applications, can lead to a higher risk of evaporation or drying out if the pen is not adequately sealed.

Several hermetic packaging and sealing materials are used to ensure that the ink remains vibrant and ready for use without drying out quickly. However, effective sealing in marker pens often involves the use of plastic and metal components, which, unfortunately, contributes to environmental concerns. The production and disposal of plastic and metal parts in marker pens can lead to environmental issues such as pollution, resource depletion, and difficulties in recycling. As these materials persist in the environment, their impact can be long-lasting.

Therefore, there is a pressing need for the development of biodegradable marker pens with exceptional sealing capabilities.

SUMMARY OF THE INVENTION

The present invention provides a biodegradable marker pen comprising a barrel, a cap, and an ink reservoir, wherein: the barrel is a hollow cylindrical structure, the ink reservoir is placed in the barrel, and the cap detachably couples with the barrel hermetically, wherein a force to separate the barrel and the cap is between 2.0 and 13.0 kilogram-force; and the barrel, the cap, and the ink reservoir comprise 2 to 10 mass percentage of a biodegradable masterbatch respectively.

Wherein, the biodegradable masterbatch comprises mono- or polyunsaturated carboxylic acid with 10 to 30 carbons and transition metal compounds.

Wherein, the biodegradable masterbatch comprises oleic acid.

Wherein, the transition metal compounds comprise compounds with iron, manganese, copper, zinc, titanium, cobalt, or combinations thereof.

Wherein, the biodegradable marker pen has a composition containing by mass percentage, polypropylene: 60% to 98%, polyethylene: 0% to 10%, polyester 5% to 35%, and a biodegradable masterbatch: 2% to 12%.

Wherein, the barrel is an open tube, and the biodegradable marker pen comprises a plug, wherein the plug fit seamlessly into one end of the barrel and hermetically sealed on the barrel.

Wherein, the ink reservoir has a composition by mass percentage of plastics: 90% to 98%, and biodegradable masterbatch: 2% to 10%; and a film covers around the ink reservoir to maintain a shape of the ink reservoir, and the film has a composition by mass percentage of polyethylene: 90% to 98%, and biodegradable masterbatch: 2% to 10%; wherein the plastics comprise polypropylene, polyethylene, polyester, or acrylonitrile butadiene styrene.

Wherein, a force to separate the barrel and the cap is between 2.0 and 13.0 kilogram-force.

Wherein, the density of the ink reservoir is between 0.13 gram per cubic centimeter to 0.24 gram per cubic centimeter.

Wherein, the cap, the plug, and the barrel are manufactured with an injection molding process from pellets of plastics and pellets of the biodegradable masterbatch, wherein the plastics comprise polypropylene, polyethylene, polyester, or acrylonitrile butadiene styrene.

Wherein, the cap and the plug are manufactured with an injection molding process from pellets of plastics and pellets of the biodegradable masterbatch, and the barrel is manufactured with an extrusion molding process from pellets of plastics and pellets of the biodegradable masterbatch, wherein the plastics comprise polypropylene, polyethylene, polyester, or acrylonitrile butadiene styrene.

Wherein, the ink reservoir is manufactured with a filament forming process from pellets of polyester and pellets of the biodegradable masterbatch, wherein the plastics comprise polypropylene, polyethylene, polyester, or acrylonitrile butadiene styrene.

DETAILED DESCRIPTION OF THE PREFERRED EMBODIMENTS

In order to make purposes, technical solutions, and advantages of the present invention to be clearer, the following content provides some preferred embodiments in accordance with the present invention.

Figure 1:
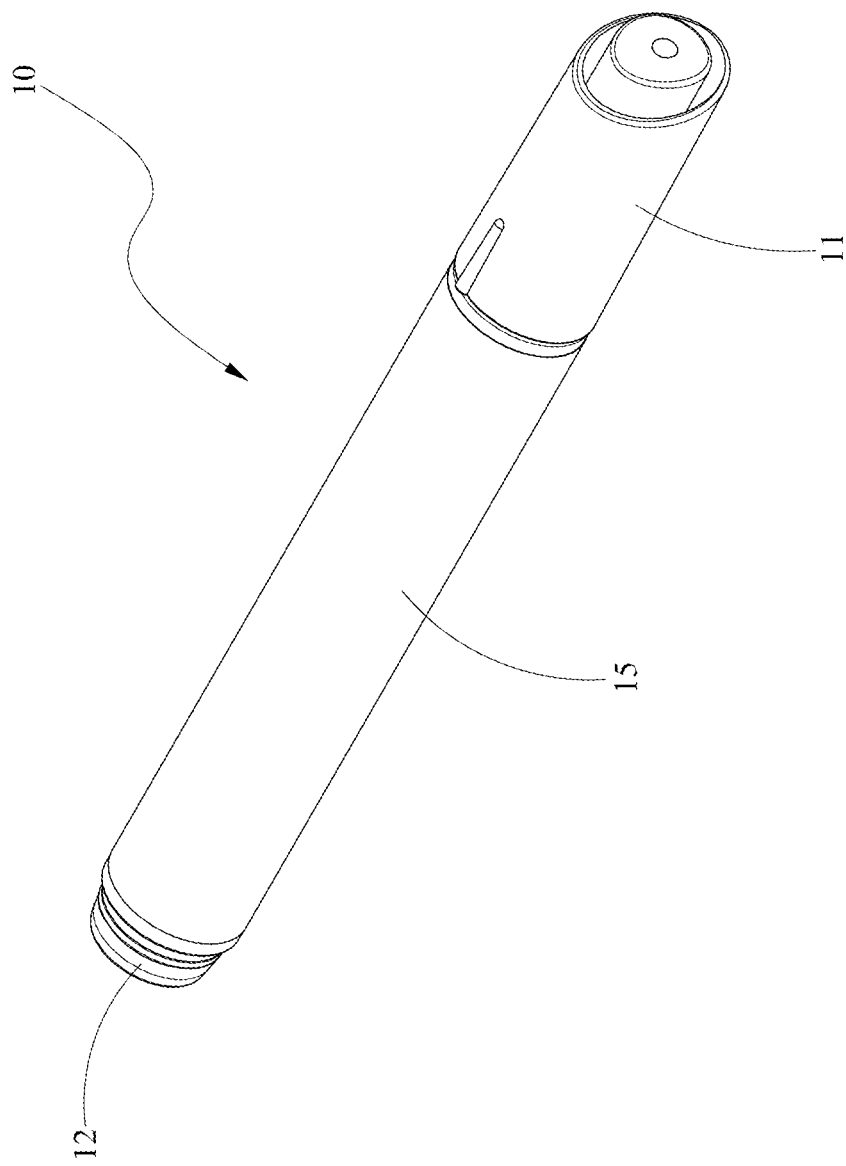
FIG. 1 is a perspective view of a first embodiment of a biodegradable marker pen in accordance with the present invention.
Figure 2:
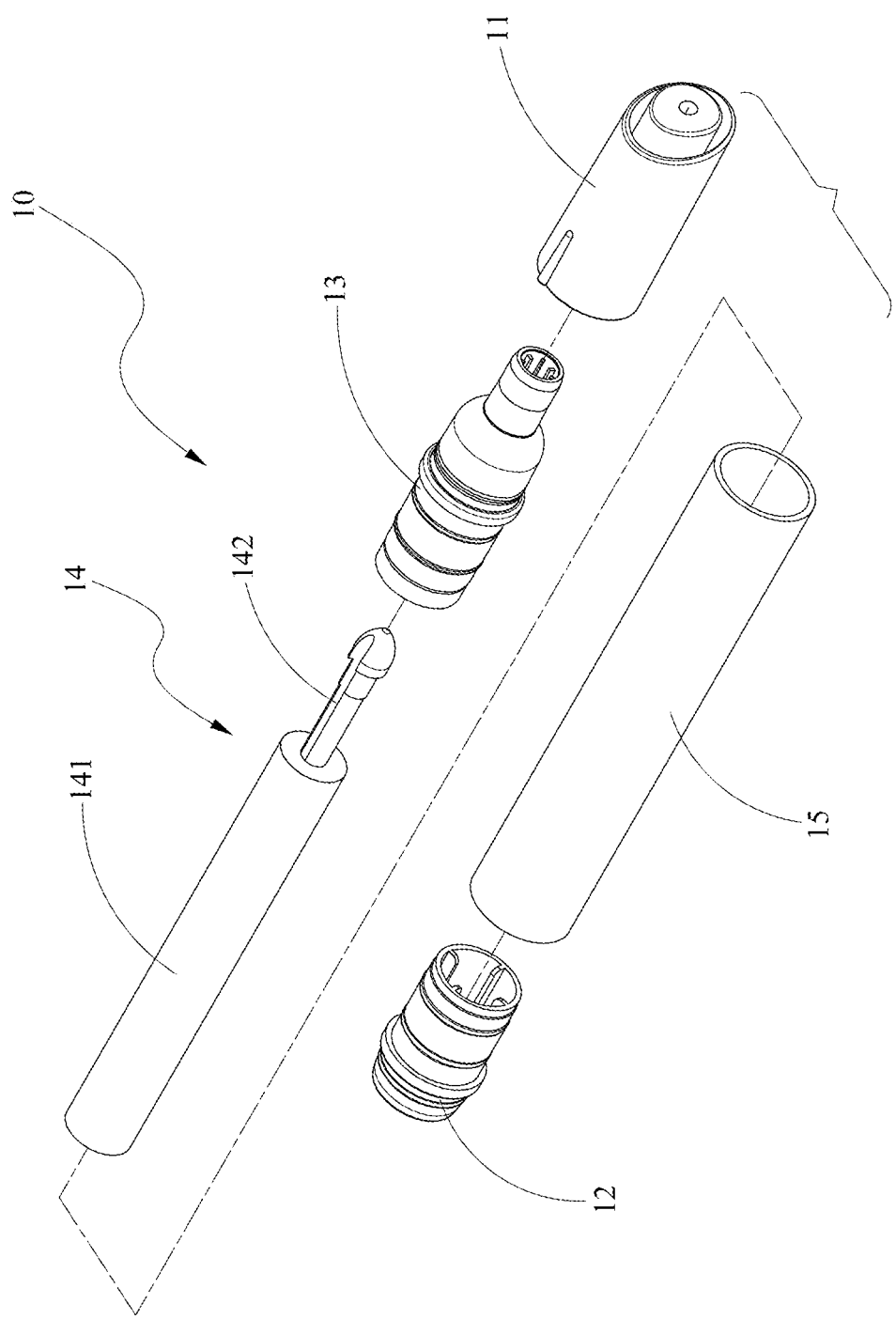
FIG. 2 is an exploded perspective view of the biodegradable marker pen in FIG. 1.
Figure 3:
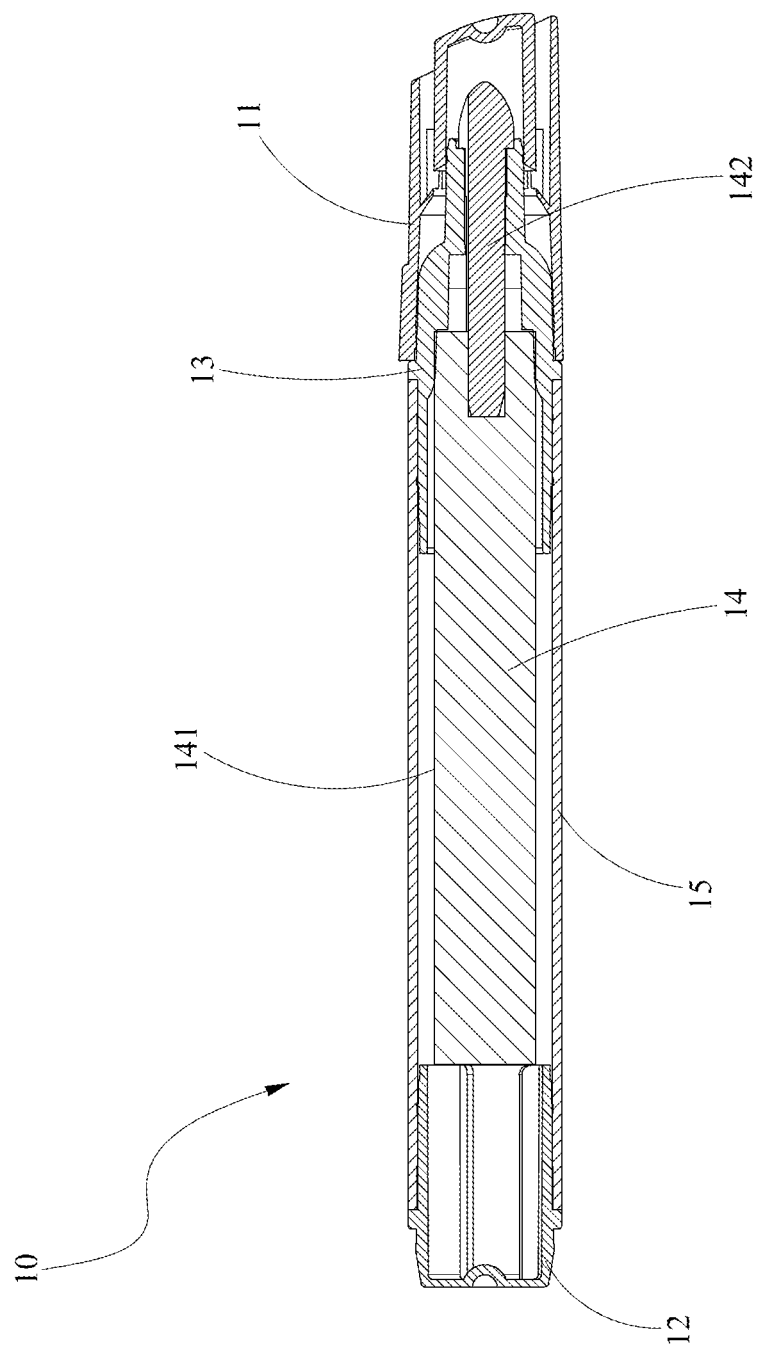
FIG. 3 is a cross-section view of the biodegradable marker pen in FIG. 1.

Referring to FIGS. 1 to 3, a first preferred embodiment of a biodegradable marker pen 10 in accordance with present invention is shown. The biodegradable marker pen 10 includes a cap 11, an ink reservoir 14, and a barrel 15.

The barrel 15 has a hollow cylindrical structure, and the barrel 15 serves as a housing for the ink reservoir 14. The barrel 15 may be an open tube or a semi-closed tube. In this embodiment, the barrel 15 is an open tube equipped with a securely affixing plug 12 at a first end of the barrel 15. The plug 12 fits seamlessly into the barrel 15 and hermetically seals the first end of the barrel 15 to provide an impermeable seal.

The ink reservoir 14 is positioned inside the barrel 15. In this embodiment, the ink reservoir 14 contains a nib 142 at a second end of the ink reservoir 14, and a film 141 covers around the ink reservoir 14 to maintain a shape of the ink reservoir 14. Furthermore, a holder 13 is placed inside the barrel 15 to position and stabilize the ink reservoir 14, and the holder 13 prevents unnecessary movement or shifting of the ink reservoir 14 in the barrel 15.

Figure 4:
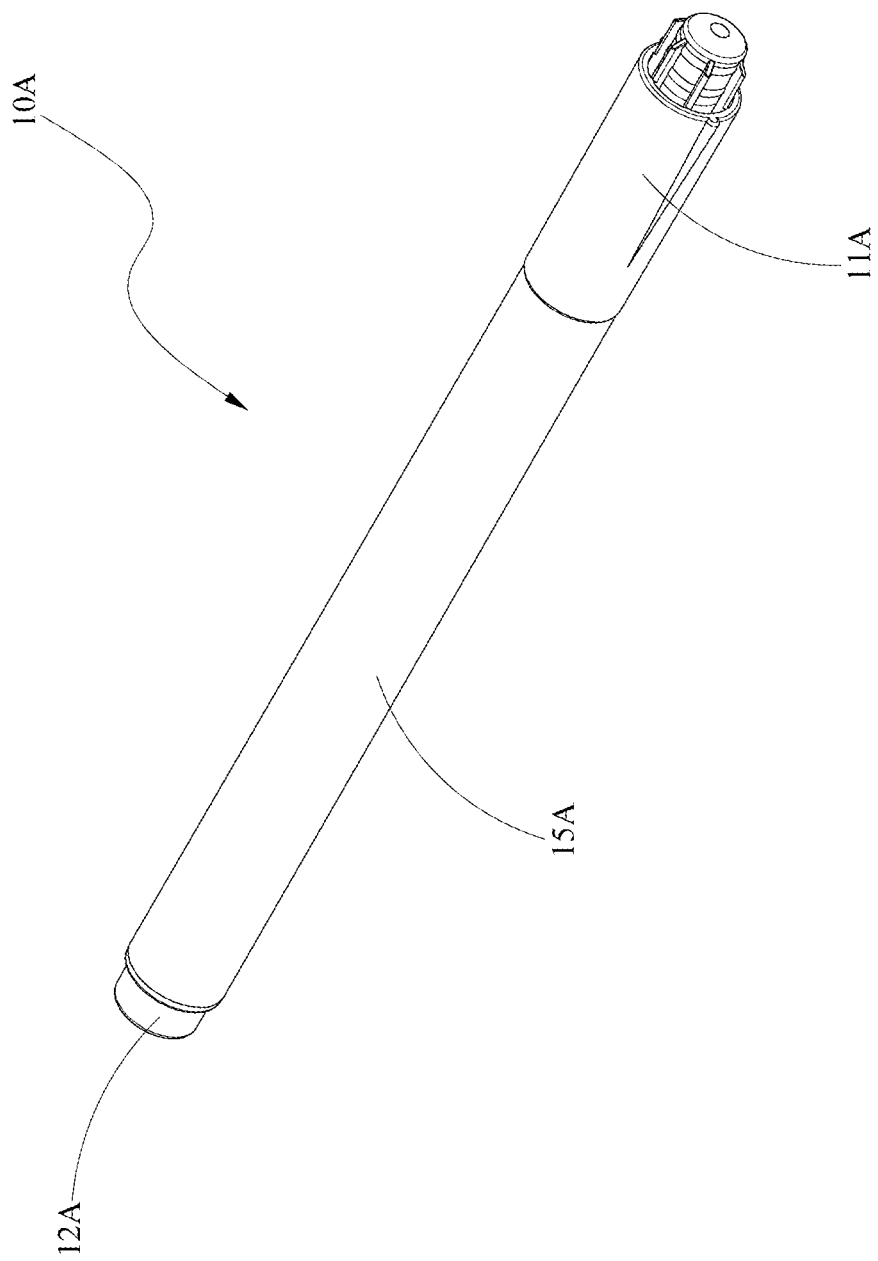
FIG. 4 is a perspective view of a second embodiment of a biodegradable marker pen in accordance with the present invention.
Figure 5:
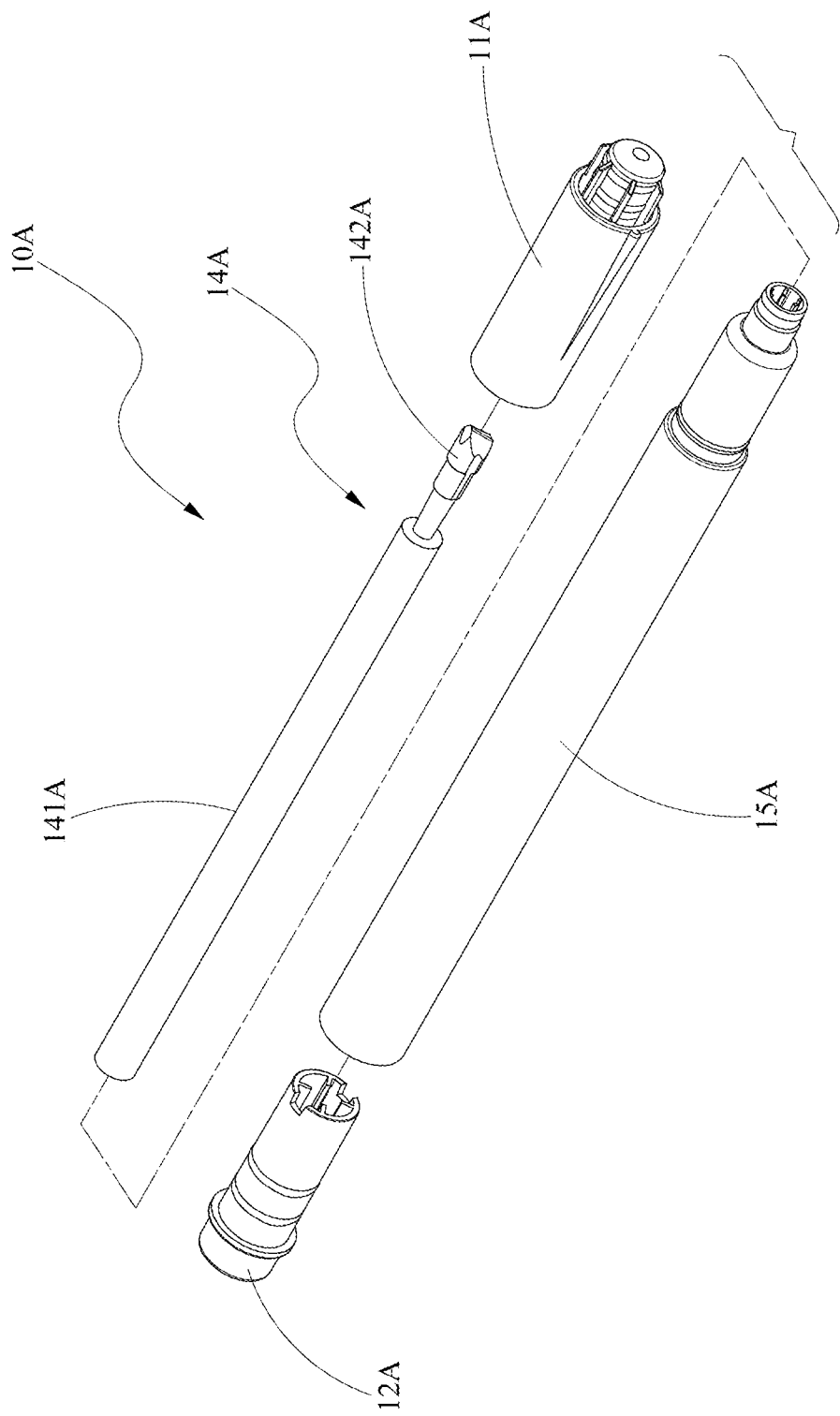
FIG. 5 shows an exploded perspective view of the biodegradable marker pen in FIG. 4.
Figure 6:
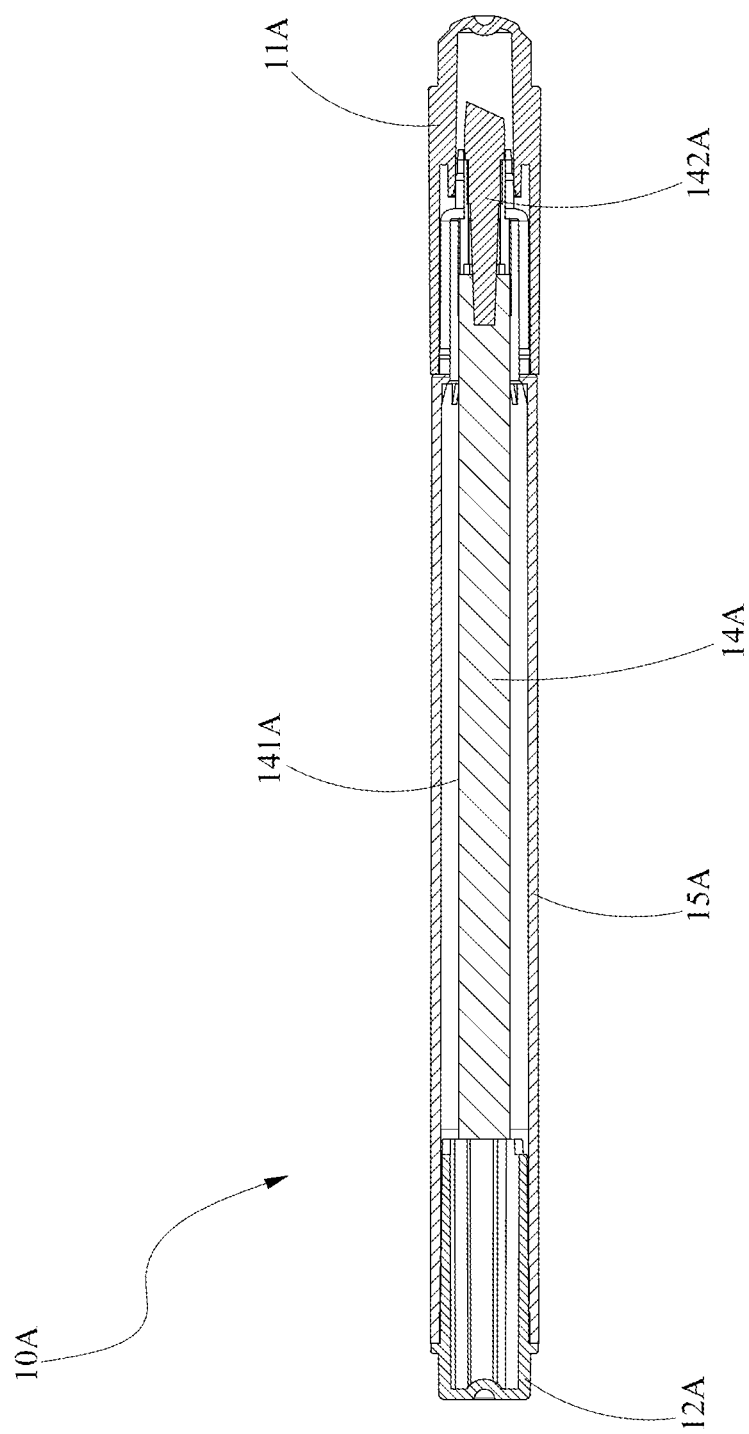
FIG. 6 shows a cross-section view of the biodegradable marker pen in FIG. 4.

Referring to FIGS. 4 to 6, a second preferred embodiment of the biodegradable marker pen 10A in accordance with present invention is shown. The biodegradable marker pen 10A includes the cap 11A, the ink reservoir 14A, and the barrel 15A.

The barrel 15A has a hollow cylindrical structure, and the barrel 15A serves as a housing for the ink reservoir 14A. The barrel 15A can be an open tube or a semi-closed tube. In this embodiment, the barrel 15A is an open tube equipped with a securely affixing plug 12A at the first end. The plug 12A fits seamlessly into the barrel 15A and hermetically seals on the first end of the barrel 15A to provide an impermeable seal.

The ink reservoir 14A is positioned inside the barrel 15A. In this embodiment, the ink reservoir 14A contains a nib 142A at a second end of the ink reservoir 14A, and the film 141A covers around the ink reservoir 14A to maintain a shape of the ink reservoir 14A. In this embodiment, a second end of the barrel 15A opposed to the first end of the barrel 15A, is tapered to hold and fit the nib 142A of the ink reservoir 14A. The gradual reduction in diameter of the second end of the barrel 15A holds the ink reservoir 14A and prevents unnecessary movement or shifting of the ink reservoir 14A in the barrel 15A.

Referring to FIGS. 1 to 6, in the first or the second preferred embodiment, when the biodegradable marker pen 10, 10A is in a close state, the cap 11, 11A securely attaches to the barrel 15, 15A through a locking mechanism to provide a sealed environment that prevents ink evaporation and leakage. The locking mechanism comprises an interlocking mechanism, a screw-thread mechanism and a snap-fit mechanism. Preferably, the locking mechanism is a snap-fit mechanism.

A force is applied to the cap 11, 11A and the barrel 15, 15A of the biodegradable marker pen 10, 10A in the close state to pull the cap 11, 11A off from the barrel 15, 15A. Preferably, the force to pull off the cap 11, 11A from the barrel 15, 15A is between 2.0 kilogram-force to 13.0 kilogram-force. More preferably, the force to pull off the cap 11, 11A from the barrel 15, 15A is between 3.0 kilogram-force to 10.0 kilogram-force. In one preferred embodiment, the force is 4.5 kilogram-force.

The biodegradable marker pen 10, 10A has a composition containing by mass percentage, plastics: 88% to 98%, and a biodegradable masterbatch: 2% to 10%. Preferably, the plastics include polypropylene, polyethylene, polyester, acrylonitrile butadiene styrene or the combination thereof.

All parts of the biodegradable marker pen 10, 10A contains the biodegradable masterbatch. In the first or the second preferred embodiment, the biodegradable marker pen 10 contains 2% of the biodegradable masterbatch distributed uniformly and homogeneously.

Preferably, the biodegradable marker pen 10, 10A has a composition containing by mass percentage, polypropylene: 60% to 98%, polyethylene: 0% to 10%, polyester 5% to 35%, and a biodegradable masterbatch: 2% to 12%.

In some preferred embodiments, the cap 11, 11A has a composition by mass percentage of polypropylene: 90% to 98%, and biodegradable masterbatch: 2% to 10%.

In some preferred embodiments, the plug 12, 12A has a composition by mass percentage of polypropylene: 90% to 98%, and biodegradable masterbatch: 2% to 10%.

In some preferred embodiments, the barrel 15, 15A has a composition by mass percentage of polypropylene: 90% to 98%, and biodegradable masterbatch: 2% to 10%.

In some preferred embodiments, the ink reservoir 14, 14A and the nib 142, 142A is made of polyester fabric, and the ink reservoir 14, 14A and the nib 142, 142A have a composition by mass percentage of polyester: 90% to 98%, and biodegradable masterbatch: 2% to 10%. Ink is added after the ink reservoir 14, 14A is made. Preferably, the polyester is polyethylene terephthalate. Preferably, the density of the ink reservoir 14, 14A is between 0.13 gram per cubic centimeter to 0.24 gram per cubic centimeter. More preferably, the density of the ink reservoir 14, 14A is between 0.17 gram per cubic centimeter to 0.21 gram per cubic centimeter.

In some preferred embodiments, the film 141, 141A has a composition by mass percentage of polyethylene: 90% to 98%, and biodegradable masterbatch: 2% to 10%. Preferably, the polyethylene is low density polyethylene.

The aforementioned biodegradable masterbatch comprises mono- or polyunsaturated carboxylic acid with 10 to 30 carbons and transition metal compounds.

Preferably, the unsaturated carboxylic acid of the biodegradable masterbatch is oleic acid. Preferably, the transition metal compounds comprise iron, manganese, copper, zinc, titanium, cobalt, or combinations thereof.

Preferably, the biodegradable masterbatch comprises two or more of the metal compounds. In one embodiment, the metal compounds of the biodegradable masterbatch contains iron and manganese.

In a preferred embodiment, the cap 11, 11A, the plug 12, 12A, the holder 13, and the barrel 15, 15A are made using an injection molding machine. Pellets of polypropylene and pellets of the biodegradable masterbatch are first mixed in a mass percentage of polyethylene: 90% to 98% and the biodegradable masterbatch: 2% to 10% and are melted to form a molten mixture. Then, the molten mixture is injected into molds with the injection molding machine to create the cap 11, 11A, the plug 12, 12A, the holder 13, and the barrel 15, 15A respectively.

For the manufacturing process of the ink reservoir 14, 14A, pellets of polyester and pellets of the biodegradable masterbatch are first mixed in a mass percentage of polyester: 90% to 98% and the biodegradable masterbatch: 2% to 10% and are melted and extruded through spinnerets to form threads. Then, the threads are cooled and twisted together and are woven or compressed to form the ink reservoir 14, 14A. The ink reservoir 14, 14A may preferably be covered with the film 141, 141A to maintain the shape and to preserve ink in the ink reservoir 14, 14A.

In some other preferred embodiments, the barrel 15 of the biodegradable marker pen 10 are manufactured with extrusion molding. Pellets of polypropylene and pellets of the biodegradable masterbatch are first mixed in a mass percentage of polyethylene: 90% to 98% and the biodegradable masterbatch: 2% to 10% and are melted to form a molten mixture. Then, the molten mixture is extruded through a die, is rapidly cooled to solidify, and is cut into the barrel 15.

Preferably, the manufacturing process of the biodegradable marker pen 10, 10A can seamlessly integrate with existing manufacturing instruments with a few alterations. The key divergence is manifested in the nuanced formulation of constituents, with incorporating 2 to 10 mass percentage of pellets of the biodegradable masterbatch into raw material composition to make the whole biodegradable marker pen 10, 10A, from the barrel 15, 15A to the cap 11, 11A and all internal components, fully biodegradable.

Measurements of the Biodegradable Marker Pen 10, 10A

Precisions of the biodegradable marker pen 10, 10A are tested. Some comparative examples of marker pens are made with same molds in abovementioned methods in accordance with this invention without adding the biodegradable masterbatch.

In table 1, specific diameters of the caps 11A of the biodegradable marker pens 10A in example 1 in accordance with this invention are compared with corresponding diameters of marker pen caps of comparative example 1 made with a same cap mold in an injection molding process.

TABLE 1

|  | Comparative example 1 (32 marker pen caps) | Example 1 (32 caps 11A) |
| --- | --- | --- |
| $1^{st}$ diameter (mm) | 8.775 ± 0.025 | 8.763 ± 0.025 |
| $2^{nd}$ diameter (mm) | 5.600 ± 0.025 | 5.679 ± 0.157 |

In table 2, specific diameters of the barrels 15A of the biodegradable marker pens 10A in example 2 in accordance with this invention are compared with corresponding diameters of marker pen barrels of comparative example 2 made with a same barrel mold in an injection molding process.

TABLE 2

|  | Comparative example 2 (16 marker pen barrels) | Example 2 (16 barrels 15A) |
| --- | --- | --- |
| $3^{rd}$ diameter (mm) | 8.525 ± 0.025 | 8.588 ± 0.025 |
| $4^{th}$ diameter (mm) | 8.600 ± 0.025 | 8.675 ± 0.001 |
| $5^{th}$ diameter (mm) | 8.93 ± 0.03 | 8.93 ± 0.04 |
| $6^{th}$ diameter (mm) | 5.72 ± 0.03 | 5.74 ± 0.02 |
| $7^{th}$ diameter (mm) | 3.125 ± 0.025 | 3.138 ± 0.025 |

In table 3, specific diameters of the plugs 12A of the biodegradable marker pens 10A in example 3 in accordance with this invention are compared with corresponding diameters of marker pen plugs of comparative example 3 made with a same plug mold in an injection molding process.

TABLE 3

|  | Comparative example 3 (16 marker pen plugs) | Example 3 (16 plugs 12A) |
| --- | --- | --- |
| $8^{th}$ diameter (mm) | 8.95 ± 0.05 | 8.99 ± 0.02 |
| $9^{th}$ diameter (mm) | 8.80 ± 0.05 | 8.84 ± 0.02 |

In table 4, specific diameters of the caps 11 of the biodegradable marker pens 10 in example 4 in accordance with this invention are compared with corresponding diameters of marker pen caps of comparative example 4 made with a same cap die in an injection molding process.

TABLE 4

|  | Comparative example 4 (32 marker pen caps) | Example 4 (32 caps 11) |
| --- | --- | --- |
| $10^{th}$ diameter (mm) | 14.125 ± 0.025 | 14.125 ± 0.05 |
| $11^{th}$ diameter (mm) | 7.900 ± 0.025 | 7.913 ± 0.025 |

In table 5, specific diameters of the holders 13 of the biodegradable marker pens 10 in example 5 in accordance with this invention are compared with corresponding diameters of marker pen holders of comparative example 5 made with a same holder mold in an injection molding process.

TABLE 5

|  | Comparative example 5 (32 marker pen holders) | Example 5 (32 holders 13) |
| --- | --- | --- |
| $12^{th}$ diameter (mm) | 4.225 ± 0.05 | 4.25 ± 0.05 |
| $13^{th}$ diameter (mm) | 14.25 ± 0.05 | 14.24 ± 0.02 |
| $14^{th}$ diameter (mm) | 8.05 ± 0.03 | 8.065 ± 0.03 |
| $15^{th}$ diameter (mm) | 14.12 ± 0.05 | 14.155 ± 0.3 |
| $16^{th}$ diameter (mm) | 4.10 ± 0.025 | 4.1 ± 0.05 |

In table 6, specific diameters and specific lengths of the barrels 15 of the biodegradable marker pens 10 in example 6 in accordance with this invention are compared with corresponding diameters and lengths of marker pen barrels of comparative example 6 made with a same barrel die in an extrusion molding process.

TABLE 6

|  | Comparative example 6 (16 marker pen barrels) | Example 6 (16 barrels 15) |
| --- | --- | --- |
| $1^{st}$ length (mm) | 86.00 ± 0.40 | 86.21 ± 0.36 |
| $17^{th}$ diameter (mm) | 16.125 ± 0.225 | 16.010 ± 0.20 |
| $18^{th}$ diameter (mm) | 13.80 ± 0.05 | 13.80 ± 0.05 |

In table 7, specific diameters of the plugs 12 of the biodegradable marker pens 10 in example 7 in accordance with this invention are compared with corresponding diameters of marker pen plugs of comparative example 7 made with a same plug mold in an injection molding process.

TABLE 7

|  | Comparative example 7 (16 marker pen plugs) | Example 7 (16 plugs 12) |
| --- | --- | --- |
| $19^{th}$ diameter (mm) | 14.325 ± 0.075 | 14.29 ± 0.06 |
| $20^{th}$ diameter (mm) | 14.12 ± 0.05 | 14.14 ± 0.06 |

From tables 1 to 7, it's evident that the examples of the embodiments of the biodegradable marker pens 10, 10A in accordance with this invention exhibit high level of precision. The examples reveal a commitment to consistency and accuracy in the components of the biodegradable marker pen 10, 10A.

Furthermore, the biodegradable marker pen 10, 10A in accordance with this invention adheres to the standards set forth by EN13432, ASTM D6400, AS 5810, NF T51-800, OECD 208, and PAS 9017:2020. The biodegradable marker pen 10 in accordance with this invention meets conditions of a 90% decomposition rate within 180 days, 90% disintegration within 84 days, absence of plant toxicity and heavy metals, and passes the seedling emergence and seedling growth test, the Daphnia magna reproduction test, earthworm reproduction test, and soil biodegradation testing in accordance with the eco-toxicity requirements of OECD 208, 222, and 211 standards and PAS 9017:2020.

Meanwhile, the biodegradable marker pen 10, 10A in accordance with this invention retains its airtight capability and remains durable during usage. The biodegradable marker pen 10, 10A can passes airtightness test with applying a pressure of 0.5 kilogram per square centimeter for 30 seconds without leakage. In one preferred embodiment, for the ink reservoir 14 of the biodegradable marker pen 10, 10A, there is no ink leakage with the nib 142, 142A facing downward for 24 hours with the ink reservoir 14, 14A containing 1.2 grams of ink.

The biodegradable marker pen 10, 10A in accordance with this invention presents a significant advantage for environmental sustainability. Unlike conventional markers that contribute to plastic pollution, this innovative biodegradable marker pen 10, 10A is crafted entirely from biodegradable materials. The biodegradable marker pen 10, 10A in accordance with this invention minimizes the environmental impact from production to disposal without compromising its quality. The biodegradable marker pen 10, 10A in accordance with this invention retains the essential quality requirement of a marker pen such as proper sealing.

Furthermore, manufacturing process of the biodegradable marker pen 10, 10A in accordance with this invention can be seamlessly integrated into the existing industry standards for marker pen production, requiring minimal alterations. This compatibility significantly diminishes the barriers to adoption and facilitates a cost-effective transition for manufacturers aiming to produce eco-friendly alternatives.

What is claimed is:

1. A biodegradable marker pen comprising a barrel, a cap, and an ink reservoir, wherein
   the barrel has a hollow cylindrical structure, the ink reservoir is placed in the barrel, and the cap is detachably coupled with the barrel hermetically; and
   the barrel, the cap, and the ink reservoir comprise 2 to 10 mass percentage of a biodegradable masterbatch respectively, wherein the biodegradable masterbatch comprises mono- or polyunsaturated carboxylic acid with 10 to 30 carbons and transition metal compounds.

2. The biodegradable marker pen as claimed in claim 1, wherein the biodegradable masterbatch comprises oleic acid.

3. The biodegradable marker pen as claimed in claim 1, wherein the transition metal compounds comprise compounds with iron, manganese, copper, zinc, titanium, cobalt, or combinations thereof.

4. The biodegradable marker pen as claimed in claim 1, wherein the biodegradable marker pen has a composition containing by mass percentage, polypropylene: 60% to 98%, polyethylene: 0% to 10%, polyester 5% to 35%, and a biodegradable masterbatch: 2% to 12%.

5. The biodegradable marker pen as claimed in claim 1, wherein the barrel is an open tube, the biodegradable marker pen comprises a plug, and the plug is fitted seamlessly into one end of the barrel and hermetically seals on the barrel.

6. The biodegradable marker pen as claimed in claim 5, wherein the cap, the plug, and the barrel are manufactured with an injection molding process from pellets of plastics and pellets of the biodegradable masterbatch, wherein the plastics comprise polypropylene, polyethylene, polyester, or acrylonitrile butadiene styrene.

7. The biodegradable marker pen as claimed in claim 5, wherein the cap and the plug are manufactured with an injection molding process from pellets of plastics and pellets of the biodegradable masterbatch, and the barrel is manufactured with an extrusion molding process from pellets of plastics and pellets of the biodegradable masterbatch, wherein the plastics comprise polypropylene, polyethylene, polyester, or acrylonitrile butadiene styrene.

8. The biodegradable marker pen as claimed in claim 1, wherein the barrel is an open tube, the biodegradable marker pen comprises a plug, and the plug is fitted seamlessly into one end of the barrel and hermetically seals on the barrel.

9. The biodegradable marker pen as claimed in claim 8, wherein the cap, the plug, and the barrel are manufactured with an injection molding process from pellets of plastics and pellets of the biodegradable masterbatch, wherein the plastics comprise polypropylene, polyethylene, polyester, or acrylonitrile butadiene styrene.

10. The biodegradable marker pen as claimed in claim 8, wherein the cap and the plug are manufactured with an injection molding process from pellets of plastics and pellets of the biodegradable masterbatch, and the barrel is manufactured with an extrusion molding process from pellets of plastics and pellets of the biodegradable masterbatch, wherein the plastics comprise polypropylene, polyethylene, polyester, or acrylonitrile butadiene styrene.

11. The biodegradable marker pen as claimed in claim 1, wherein the ink reservoir has a composition by mass percentage of plastics: 90% to 98%, and biodegradable masterbatch: 2% to 10%; and
    a film covers around the ink reservoir to maintain a shape of the ink reservoir, and the film has a composition by mass percentage of plastics: 90% to 98%, and biodegradable masterbatch: 2% to 10%; wherein the plastics comprise polypropylene, polyethylene, polyester, or acrylonitrile butadiene styrene.

12. The biodegradable marker pen as claimed in claim 11, wherein the density of the ink reservoir is between 0.13 gram per cubic centimeter to 0.24 gram per cubic centimeter.

13. The biodegradable marker pen as claimed in claim 1, wherein a force to separate the barrel and the cap is between 2.0 and 13.0 kilogram-force.

14. The biodegradable marker pen as claimed in claim 1, wherein the density of the ink reservoir is between 0.13 gram per cubic centimeter to 0.24 gram per cubic centimeter.

15. The biodegradable marker pen as claimed in claim 1, wherein the ink reservoir is manufactured with a filament forming process from pellets of polyester and pellets of the biodegradable masterbatch, wherein the plastics comprise polypropylene, polyethylene, polyester, or acrylonitrile butadiene styrene.

* * * * *